United States Patent [19]
Peel et al.

[11] 3,841,659
[45] Oct. 15, 1974

[54] VEHICULAR THREE-POINT SEAT BELT SYSTEM

[75] Inventors: Richard E. Peel, Farmington Hills; Harkrishan Singh, Dearborn Heights, both of Mich.

[73] Assignee: Ford Motor Company, Dearborn, Mich.

[22] Filed: Dec. 26, 1973

[21] Appl. No.: 428,529

[52] U.S. Cl. ............................. 280/150 SB, 297/389
[51] Int. Cl. ............................................ B60R 21/10
[58] Field of Search .............. 280/150 SB; 297/389; 24/200

[56] References Cited
UNITED STATES PATENTS

| 3,415,538 | 12/1968 | Radke | 280/150 SB |
| 3,418,007 | 12/1968 | Jantzen | 280/150 SB |
| 3,754,775 | 8/1973 | Williams | 280/150 SB |

Primary Examiner—Robert R. Song
Attorney, Agent, or Firm—Keith L. Zerschling; John J. Roethel

[57] ABSTRACT

A vehicular three-point seat belt system comprising separate shoulder and lap belt sections each having a looped terminal end connected to a common tongue element having a main plate portion and a buckle engageable portion. The main plate portion has a multi-section aperture therein comprising spaced slot sections connected at corresponding terminal ends by an angular slot section, the spaced slot sections extending laterally, and preferably normally, to a longitudinal axis of the elongated buckle engageable portion. The relationship of the slots and the terminal ends of the belts is such that in non-user position of the seat belt system the elongated buckle engageable portion of the tongue element is concealed within one of the looped terminal ends. In user position, a buckle engageable portion of the tongue element is exposed for insertion into a buckle.

6 Claims, 3 Drawing Figures

PATENTED OCT 15 1974  3,841,659

3,841,659

VEHICULAR THREE-POINT SEAT BELT SYSTEM

BACKGROUND OF THE INVENTION

One design of a vehicular three-point seat belt system currently available utilizes separate shoulder and lap belt sections each having a looped terminal end connected to a common tongue element. The tongue element has a main plate portion and an elongated buckle engageable portion. The tongue element has in its main plate portion two angularly related slot sections, a wall of each slot section passing through a respective terminal loop end. The relationship of the slot sections to the lap and shoulder belts in non-user position of the latter is such that the tongue element is held in a suspended position adjacent the side of the vehicle seat cushion. The tongue element buckle engageable portion frequently projects above the seat cushion surface providing an obstruction to anyone trying to seat themselves on the seat cushion.

It is an object of the present invention to control the relationship of the tongue element buckle engageable portion to the shoulder and lap belt sections so that in non-user position the buckle engageable element is concealed within one of the belt terminal end portions.

SUMMARY OF THE INVENTION

The present invention relates to a vehicular three-point seat belt system comprising separate shoulder and lap belts each having a looped terminal end connected to a common tongue element. The tongue element has a main plate portion and an elongated buckle engageable portion. The main plate portion has a multi-section aperture therein comprising spaced slot sections connected at corresponding terminal ends by an angular slot section. The spaced slot sections extend laterally to a longitudinal axis of the elongated buckle engageable portion and are preferably parallel to each other. In non-user position, each belt has its looped terminal end encircling a wall of one of the respective slot sections with the elongated buckle engageable portion of the tongue element being substantially concealed within one of the looped terminal ends. In user position, the buckle engageable portion of the tongue element is exposed for insertion into a buckle upon relative movement of the one belt looped terminal end to the angular slot section of the tongue element aperture.

Preferably, the looped terminal end concealing the buckle engageable portion of the tongue element in non-user position is on the shoulder belt.

DESCRIPTION OF THE DRAWING

Further features and advantages of the present invention will be made more apparent at this description proceeds, reference being had to the accompanying drawing, wherein.

DETAILED DESCRIPTION OF THE INVENTION

Figure 1:
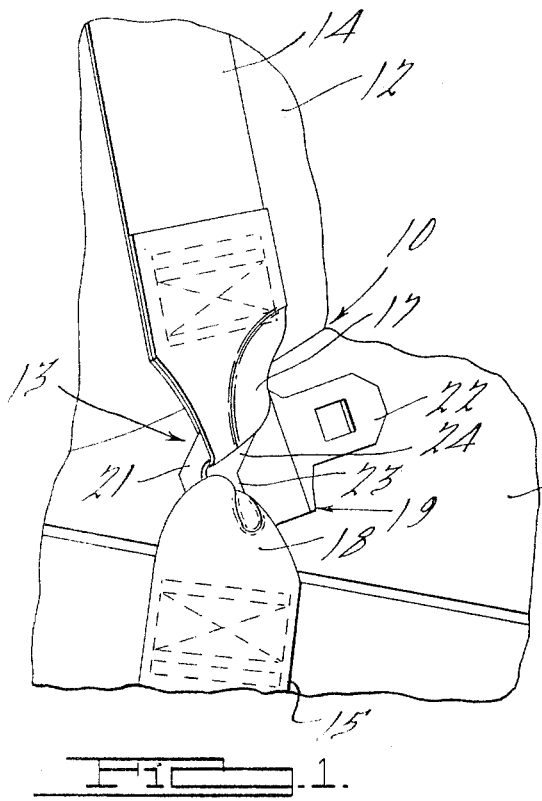
FIG. 1 is a partial perspective view of a conventional three-point vehicular seat belt system illustrating the relationship in non-user position of a tongue element to the lap and shoulder belt terminal ends.

Referring now to FIG. 1, numeral 10 denotes a vehicle seat structure having a seat cushion 11 and a seat back 12. Adjacent one side of the seat structure 10 are parts of a conventional vehicular seat belt system 13 comprising separate shoulder and lap belt sections 14 and 15, respectively. The shoulder belt section 14 passes upwardly along the seat back where it may be coupled to a retractor mechanism (not shown). The lap belt section 15 extends downwardly alongside the seat cushion 11 to a floor mounted retractor mechanism 16 (see FIG. 2).

Each belt section has a looped terminal end connection 17 and 18, respectively. The belt sections 14-15 are connected to a common tongue element 19 having a main plate portion 21 and an elongated buckle engageable portion 22. The buckle engageable portion 22 is adapted to engage a buckle device (not shown) carried on a lap belt section (not shown) anchored to the vehicle floor on the opposite side of the passenger seating position operatively associated with the belt sections 15 and 16.

The main plate portion 21 of the tongue element 19 has two intersecting slot sections 23 and 24. The slot section 23 extends substantially normal to a longitudinal axis through the elongated buckle engageable portion 22 of the tongue element and the slot section 24 extends angularly from one end of slot 23. The terminal end portions of the belt sections encircle the exterior walls of the respective slots.

The difficulty with the conventional tongue element 19 as shown in FIG. 1 is that in its non-user position, i.e., the position in which the belt sections 14 and 15 are not buckled about a seat occupant, the buckle engageable portion 24 projects at an obstructive angle relative to the seat back 12 in seat cushion 11. This creates a hazard that interferes with easy access to the seat by a person desiring to occupy the same.

Figure 2:
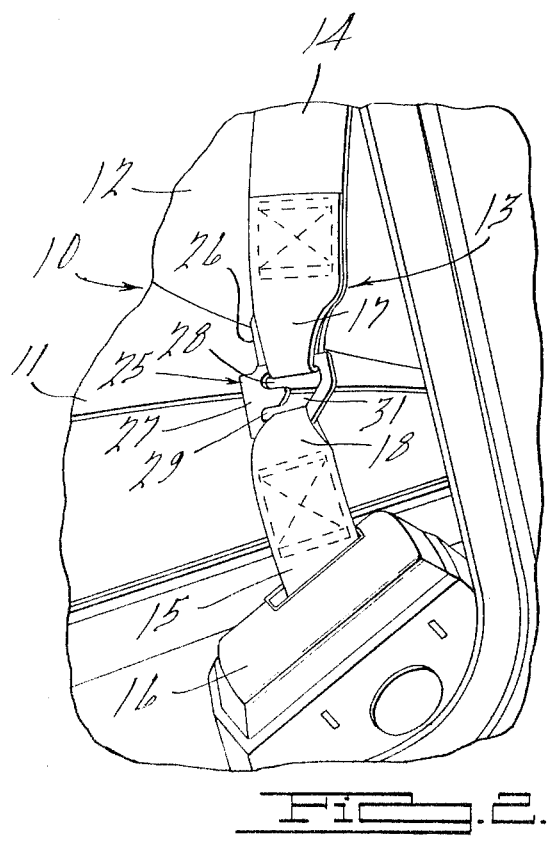
FIG. 2 is a view in part similar to FIG. 1 illustrating a tongue element in accordance with the present invention.

Referring now to FIG. 2, there is disclosed a tongue element 25 which does not appear to have a buckle engageable portion corresponding to the buckle engageable portion 22 of the tongue element 19. This is because in non-user position of the seat belt system the buckle engageable portion 26 of the tongue element 25 is substantially concealed within the looped terminal end of one of the belt sections, preferably the looped terminal end 17 of the shoulder belt section 14. This is achieved by an arrangement of slots in the main plate portion 27, as will be described.

Figure 3:
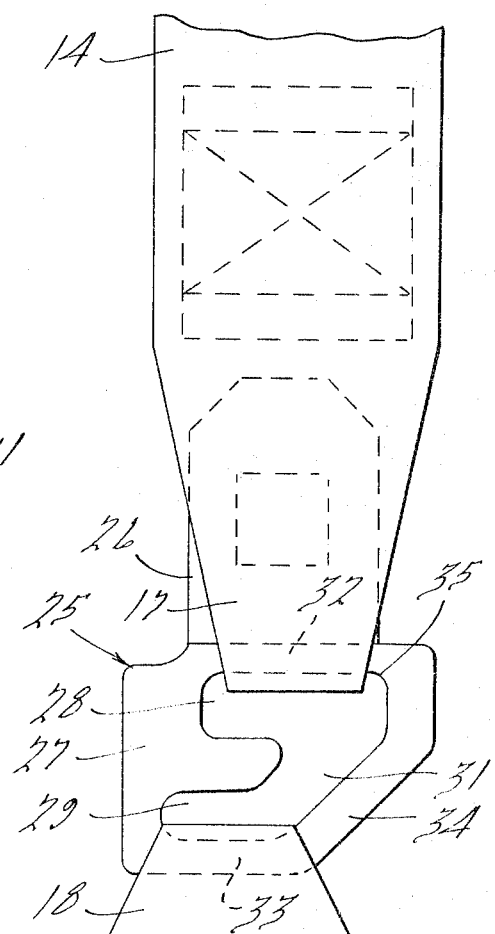
FIG. 3 is an enlarged view of the terminal ends of the belt sections and a tongue element embodying the present invention in non-user position.

The main plate portion 27 has a multi-section aperture comprising a plurality of slots 28, 29 and 31, respectively. The slots 28 and 29 extend laterally of a longitudinal axis of the buckle engageable element 26 and, preferably, are substantially normal to the axis and therefore substantially parallel to each other. The corresponding ends of the slots 28-29, the right ends as best seen in FIG. 3, are connected by the third slot 31, the latter extending angularly upwardly from left to right.

With this tongue element 25, the looped terminal end 17 encircles the outer wall 32 of the slot 28 and the looped terminal end 18 encircles the outer wall 33 of the slot 29. The belt sections 14-15 assume substantial alignment with the longitudinal axis of the tongue element 25 elongated buckle engaging portion 26 with the buckle engaging portion tucked into or concealed within the looped terminal end portion 17 of the shoulder belt section 14. The buckle engaging portion 26 thus does not project into the seat cushion — seat back area as in the heretofore utilized system shown in FIG. 1.

When it is desired to buckle the tongue element 25 to a buckle element, the tongue element is grasped to pull the shoulder and lap belts 14–15 inwardly over the seat structure. The tongue element 25 will freely twist relative to the looped terminal end 17 of the shoulder belt 14. The looped terminal end 17 will slip around the corner 35 between the slots 28 and 29 and end up encircling the wall 35 of the slot 32. The tongue element 25 will assume a relationship to the belt sections similar to that of the FIG. 1 tongue element 19 with the buckle engageable portion 26 exposed and ready to be snapped into its buckle. Upon release of the buckle, the belt sections 14 and 15 and tongue element 25 will self-restore to their FIGS. 2–3 positions.

It should be noted that FIGS. 1 and 2 represent views taken on the right-hand and left-hand sides of a vehicle seat structure, respectively, and therefore represent mirror images of each other.

It is to be understood that this invention is not limited to the next construction illustrated and described above, but that various changes and modifications may be made without departing from the spirit and scope of the invention as defined by the following claims.

We claim:

1. A vehicular three-point seat belt system comprising separate shoulder and lap belt sections each having a looped terminal end connected to a common tongue element, the tongue element having a main plate portion and an elongated buckle engageable portion, the main plate portion having a multi-section aperture therein comprising spaced slot sections connected at corresponding terminal ends by an angular slot section, the spaced slot sections extending laterally to a longitudinal axis of the elongated buckle engageable portion, in non-user position each belt section having its looped terminal end encircling a wall of one of the respective slot sections with the elongated buckle engageable portion of the tongue element being substantially concealed within one of the looped terminal ends, and in user position the buckle engageable portion of the tongue element being exposed for insertion into a buckle upon relative movement of the one belt looped terminal end to the angular slot section of the tongue element aperture.

2. A vehicular three-point seat belt system according to claim 1, in which:

the looped terminal end concealing the buckle engageable portion of the tongue element in non-user position is on the shoulder belt.

3. A vehicular three-point seat belt system according to claim 2, in which:

the lateral slot sections are substantially normal to the longitudinal axis of the elongated buckle engageable portion.

4. A vehicular three-point seat belt system according to claim 2, in which:

the lateral slot sections are substantially parallel to each other.

5. A vehicular three-point seat belt system according to claim 1, in which:

the lateral slot sections are substantially normal to the longitudinal axis of the elongated buckle engageable portion.

6. A vehicular three-point seat belt system according to claim 1, in which:

the lateral slot sections are substantially parallel to each other.

* * * * *